United States Patent [19]

Odell

[11] Patent Number: 5,304,808
[45] Date of Patent: Apr. 19, 1994

[54] METHOD AND APPARATUS FOR DATA SAMPLING

[75] Inventor: Daniel M. C. Odell, Aiken, S.C.

[73] Assignee: The United States of America as represented by the United States Department of Energy, Washington, D.C.

[21] Appl. No.: 14,916

[22] Filed: Feb. 8, 1993

[51] Int. Cl.$^5$ ................................................ G01T 1/17
[52] U.S. Cl. ............................. 250/395; 250/363.07; 250/369
[58] Field of Search ................... 250/395, 369, 363.07

[56] References Cited

U.S. PATENT DOCUMENTS

| 4,228,512 | 10/1980 | Thompson et al. | 364/527 |
| 4,369,495 | 1/1983 | Inbar et al. | 364/413.24 |
| 4,415,982 | 11/1983 | Nishikawa | 364/527 |
| 4,535,242 | 8/1985 | Dirkse et al. | 250/363.07 |
| 4,599,690 | 7/1986 | Stoub | 364/413.24 |
| 4,697,078 | 9/1987 | Randall | 250/256 |
| 4,749,859 | 6/1988 | Schmidt | 250/270 |
| 5,132,540 | 7/1992 | Adolph et al. | 250/369 |
| 5,210,423 | 5/1993 | Arseneau | 250/369 |

Primary Examiner—Constantine Hannaher
Attorney, Agent, or Firm—Brian R. Tumm; Harold M. Dixon; William R. Moser

[57] ABSTRACT

A method and apparatus for sampling radiation detector outputs and determining event data from the collected samples. The method uses high speed sampling of the detector output, the conversion of the samples to digital values, and the discrimination of the digital values so that digital values representing detected events are determined. The high speed sampling and digital conversion is performed by an A/D sampler that samples the detector output at a rate high enough to produce numerous digital samples for each detected event. The digital discrimination identifies those digital samples that are not representative of detected events. The sampling and discrimination also provides for temporary or permanent storage, either serially or in parallel, to a digital storage medium.

19 Claims, 2 Drawing Sheets

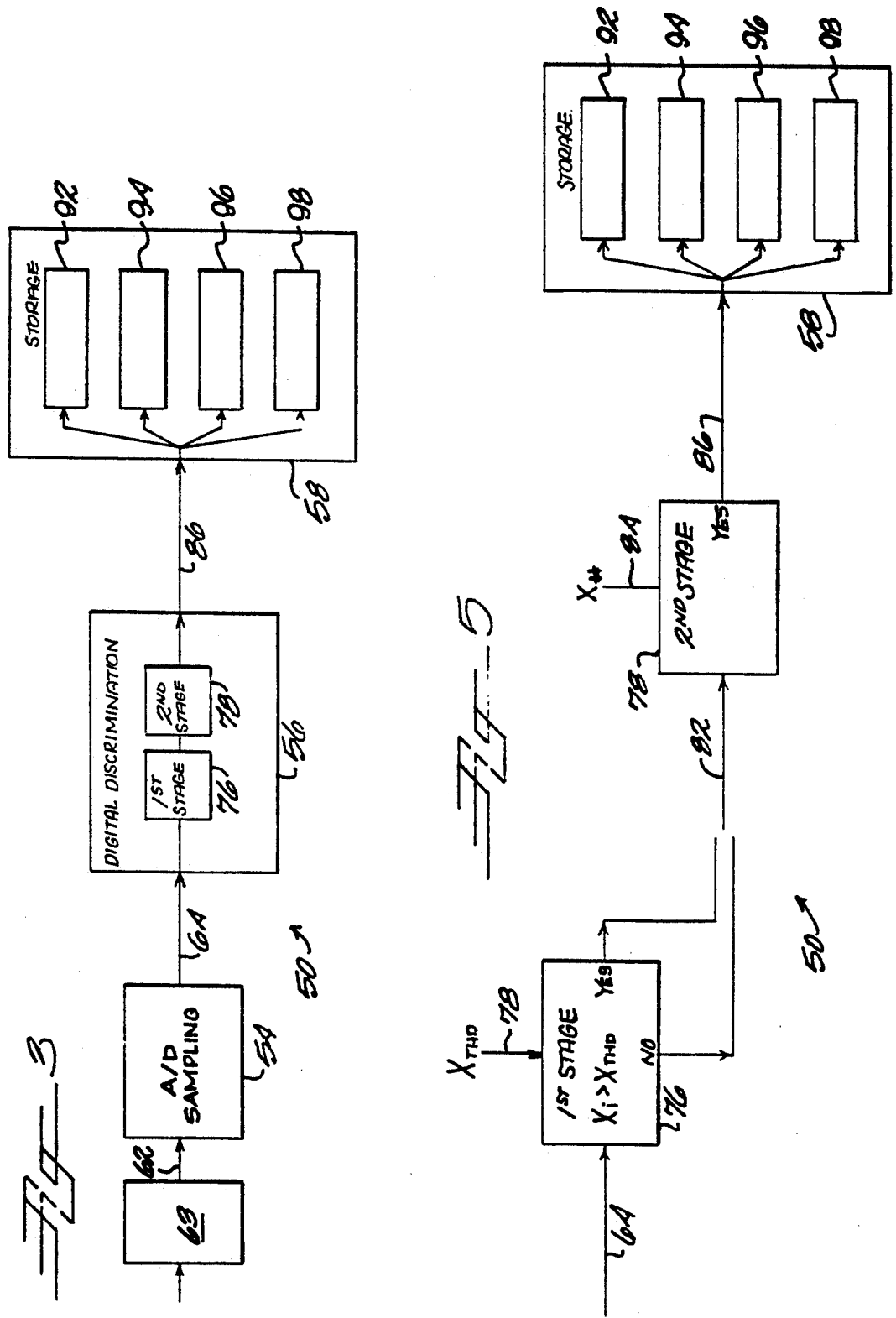

METHOD AND APPARATUS FOR DATA SAMPLING

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to detecting events. More particularly, the present invention relates to sampling nuclear radiation detector signal outputs representing events.

2. Discussion of Background

There exist many devices and techniques for obtaining event data from detectors. Many detectors are used for detecting radiation pulse charges or other radiation events, and have been connected to detection systems that are, for the most part, analog in nature.

For example, radiation detectors are used in U.S. Pat. No. 5,132,540, by Adolph et al, which features nuclear spectroscopy analysis device for detecting random nuclear events, and in U.S. Pat. No. 4,599,690, by Stoub. Also, Inbar et al, in U.S. Pat. No. 4,369,495 and Thompson et al, in U.S. Pat. No. 4,228,512, disclose radiation charge detectors.

Usually, collection systems for such detectors are event-triggered, that is, when the detector output exceeds a certain threshold value, the collection system enables the data collection or other processing devices. The data stream present at that time is collected or processed until the detected value falls below the threshold value, whereby the device is returned to its normal or "non-event" state.

An event-triggered system has several limitations, one of which is known as dead-time. Due to the nature of the event-triggered system, once the system is triggered by the start of an event, the system cannot collect or otherwise process subsequent data until returned to its normal or "non-event" state at the conclusion of the first event.

This time interval, during the collection and processing of the first event data, is called dead-time, since the system is essentially oblivious to any incoming signals of subsequent events until the prior event is processed. Dead-time limitations can be attributed to the collective speed of the individual component devices of the system in relation to the frequency of event occurrence and detection. Also, storage and processing time in relation to the frequency of data collection contributes to dead-time.

Another problem with event-triggered systems is distinguishing between separate, nearly simultaneous, detected events. Because the event-triggered system is enabled when a detected signal is above a threshold value and disabled when a detected signal is below the threshold value, the nearly simultaneous occurrence of more than one event is often treated by the system as a single event of extended duration.

This lack of discrimination occurs because the later event begins and is detected above the threshold value before the former event is completed and the system can return to its normal state from the first event. Consequently, the signals of the two separate events are not resolved by the system but are treated as a single event.

Obviously, the limitations of event-triggered systems lead to inaccurate collection, storage and processing of event data. As a result, some or even all of the data has to be discarded or data lost during the system dead-time may have to be synthesized by statistical or other compensation methods.

For instance, Adolph et al, in U.S. Pat. No. 5,132,540, uses comparative reference data to determine data undetected because of dead-time. In U.S. Pat. No. 4,599,690, Stoub corrects for dead-time using a replication probability. Similarly, Inbar et al, in U.S. Pat. No. 4,369,495, uses synthetic pulses based on a statistical correction factor. However, these compensating methods are often inadequate for replacing information undetected because of dead-time and processing delays.

There exists a need for a sampling, collection, and processing system that records substantially each event.

SUMMARY OF THE INVENTION

According to its major aspects and broadly stated, the present invention is a method and apparatus for sampling detector outputs and determining event data from the samples. In particular, the method uses high speed sampling of the detector output, conversion of the samples to digital values, and discrimination of the digital values so that digital values representing detected events are determined. The high speed sampling and digital conversion is performed by an A/D sampler that samples the detector output at a rate high enough to produce numerous digital samples for each detected event. The digital discrimination identifies those digital samples that are not representative of detected events. Preferably, the system provides for temporary or permanent storage, either serially or in parallel, to a digital storage medium, such as random access memory (RAM) or storage registers.

A major feature of the present invention is the conversion of detector output from the analog to digital domain before data analysis and further processing. This conversion does not allow complete charge collection, that is, no integration of charge occurs prior to digitization, as in prior data collection systems. However, the use of continual, high-speed digital sampling, as described below, compensates for incomplete charge collection by reducing dead-time. The advantage of this feature is that these digital processes are not subject to the drift and variations of their analog counterparts and can be implemented in parallel processing architecture, thereby speeding up the entire process and reducing potential dead-time.

Another feature of the present invention is the use of an extremely high sampling rate for taking readings from the detector output. The high sampling rate allows a larger number of samples, at smaller time intervals, to be taken during the occurrence of each event. This feature improves the accuracy of the data, since each detected event can be more accurately represented by the larger amount of samples generated by the continuous, free-running A/D converting process.

Still another feature is the use of digital discrimination processes for a stream of sequential data in order to distinguish event samples from samples containing only "non-events." This feature enables the processing and reduction to a useful form of what would otherwise be a continuous, unmanageable stream of data without having delays in the system processes and thus contributing to the system's inherent dead-time.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a schematic view of a sampling and detection system according to the preferred embodiment of the present invention;

FIG. 5 is a schematic view of the discrimination and storing functions of the system of FIG. 3.

DETAILED DESCRIPTION OF A PREFERRED EMBODIMENT

Figure 1:
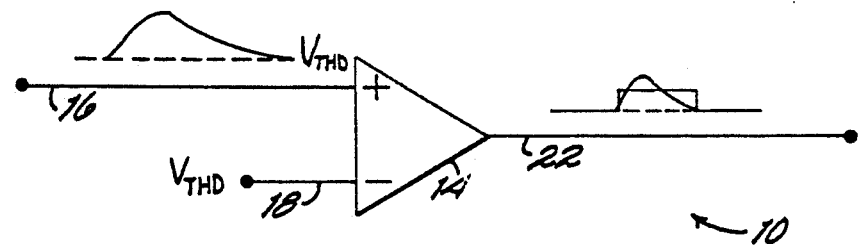
FIG. 1 is a schematic view of the triggering circuitry in prior art event-triggered systems.

In the following description similar components are referred to by the same reference numeral in order to simplify the understanding of the sequential aspect of the drawings.

The present invention is a method and apparatus for counting events, such as pulses from a radiation detector. An event begins at some point when it is reasonably clear that a disturbance on a signal line represents an event—a pulse—and not simply "noise". When no pulse is occurring, the signal output represents only non-events. Prior art, event-triggered systems, particularly radiation energy spectroscopy systems for collecting and analyzing radiation data, have often relied on analog methods with analog-to-digital conversion occurring just prior to storage of collected data in various storage media. This conventional system is based on the use of an integrating amplifier for summing the energy of the incoming pulse from the detector. The pulse then undergoes various analytical procedures, including amplification, discrimination, and the like, all within the analog domain. Then, the analyzed pulse is converted to a digital signal just before storage and end use.

Referring now to FIG. 1, the collection of data in conventional, event-triggered systems is typically triggered by an analog discriminating configuration 10. In this configuration, an analog discriminator 14, has a positive input 16, a negative input 18, and an output 22. Positive input 16 is connected to the output of the detector (not shown) or other source for the incoming, time-varying pulse signals. Negative input 18 is placed in electrical connection with a threshold voltage, $V_{THD}$.

$V_{THD}$ is set to a threshold value of voltage that must be established by the incoming pulse signal in order for the data collection and analysis portions of the system to be enabled. Thus, $V_{THD}$ depends on the type of data being detected and is set according to the particular characteristics of the incoming data pulses. Ideally, $V_{THD}$ is set so that its value is small enough to trigger data collection at the beginning of an event, yet large enough to prevent only non-event data received by positive input 16 from being accepted and processed as though it represented pulses.

Output 22, which is usually connected to the enabling input of the data collection circuitry of a conventional system, supplies a digital value of either 1 or 0, depending on whether the value of the incoming pulse is above or below $V_{THD}$. Output 22, in its normal state, has a value of 0 or false. However, once the voltage level at positive input 16 becomes greater than or equal to $V_{THD}$, output 22 instantaneously changes to a digital value of 1 or true, thus turning the system "on".

Once the system is turned on, collection, amplification, and other processes of the kind to be performed on the incoming data are enabled. These processes continue until the value of output 22 returns to a digital value of 0, which disables such processes. Process disabling occurs when the voltage level at positive input 16 falls below $V_{THD}$, which is usually caused by the completion of the detected event.

Figure 2A:
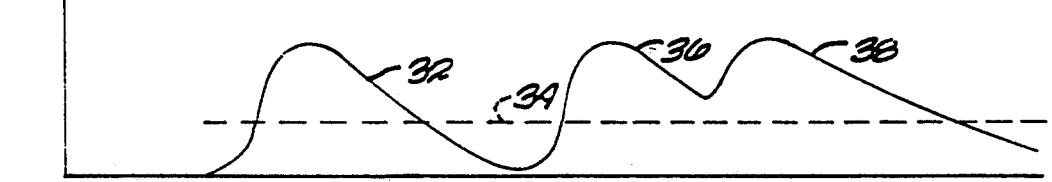
FIG. 2a is a graphical view of a sample analog waveform having more than one event.
Figure 2B:
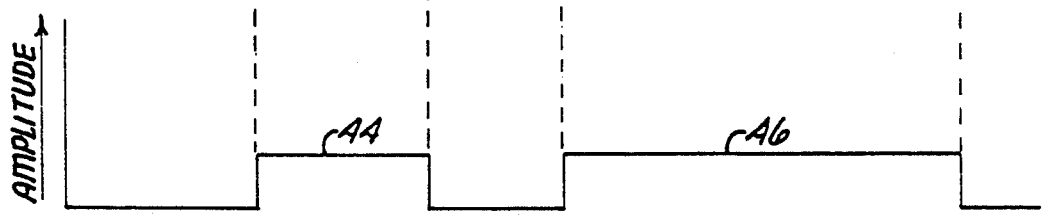
FIG. 2b is a graphical view of a digital representation of the sample analog waveform of FIG. 2a using prior art, event-triggered systems.

Inherent in the enabling/disabling circuitry of conventional systems using the triggering configuration of FIG. 1 is the inability to distinguish between two or more nearly simultaneous detected events. Referring now to FIGS. 2a-2b, a sample waveform 30 of a series of events detected by the detector in a conventional system is shown in FIG. 2a, and the corresponding digital waveform 40 of the output of the triggering configuration of FIG. 1 is shown in FIG. 2b.

A first event 32 in waveform 30 represents the occurrence of a single event as seen by the detector (not shown). As soon as first event 32 rises above a level 34 of $V_{THD}$, a first triggering signal 44 in waveform 40 switches correspondingly to a digital value of 1 for as long as first event 32 remains greater than or equal to $V_{THD}$. Once first event 32 falls below $V_{THD}$, first triggering signal 44 instantaneously switches back to a digital value of 0.

A second event 36 and a third event 38 in waveform 30 represents the occurrence of two nearly simultaneous events as seen by the detector. As seen in FIG. 2b, a second triggering signal 46 in waveform 40 does not distinguish between events 36 and 38 since third event 38 rises above $V_{THD}$ before second event 36 falls below $V_{THD}$. Thus, when more than one event is greater than or equal to $V_{THD}$ at the same time, the events cannot be discerned by event-triggered circuitry. Second triggering signal 46 continuously enables the collection and analysis processes throughout the occurrence of events 36 and 38, without discriminating between the two events. Consequently, the conventional event-triggered system treats events 36 and 38 as one continuous event, rather than two separate events.

Referring now to FIG. 3, the present invention, in its preferred embodiment, is a data sampling system 50 consisting of a high rate, analog-to-digital (A/D) sampling device 54 and a two-stage digital discrimination device 56. Also, a digital storage medium 58 may be included for storing resulting data.

A/D sampling device 54 has an input 62 directly connected to the output of a detector (not shown). Alternatively, the detector output may be routed through a linear amplifier 63 prior to connection with A/D sampling device 54, as linear amplifier 63 may be required to properly drive A/D sampling device 54. A/D sampling device 54 takes sample readings from the detector output at a very high sampling rate, regardless of whether or not an event is occurring, and converts the samples into corresponding digital values. An output 64 from sampling device 54 serves as the input to two-stage discrimination device 56.

The sampling rate employed by sampling device 54 is chosen based on the fundamental frequency and duration of the waveform of event pulses to be detected and the desired resolution of the overall sampling system. Higher sampling rates equate to higher energy resolution measurements of the detector output. The sampling rate for sampling device 54 is set high enough so that a large number of samples per event can be taken, thereby obtaining a sufficiently accurate digital representation of each event. Sampling device 54 performs two functions: obtaining a number of samples at the preselected rate and converting each of the samples to a digital value for further processing.

Figure 4:
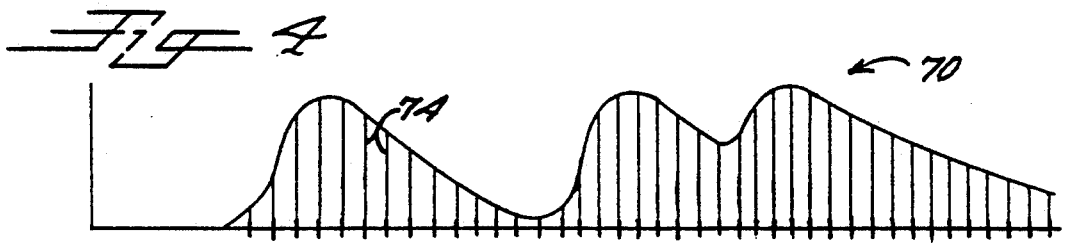
FIG. 4 is a graphical view of the sample waveform of FIGS. 2a-2b showing the sampling frequency of the system of FIG. 3.

For instance, in FIG. 4, a waveform 70, similar to waveform 30, is shown along with a corresponding plurality of samples 74 of waveform 70 taken by A/D sampling device 54 as a function of time. If a more accurate representation of waveform 70 is needed, the sampling rate of sampling device 54 would be increased to provide more samples per unit of time. Therefore, the change in value of waveform 70 as a function of time would be represented more accurately by the increased number of samples taken. It should be noted that the minimum frequency to be used must be at least equal to the Nyquist criteria for the event pulses being sampled, that is, at least two times the highest frequency component of a typical event pulse.

While conventional systems determine if information is desirable prior to processing the information, data sampling system 50 takes both desirable and undesirable information in the form of samples, converts the samples to digital values, and subsequently processes the stream of digital values before eliminating the undesirable information. Thus, in FIG. 3, the sequential stream of digital values coming from output 64 of A/D sampling device 54 contains values representing only events, events plus non-events, and only non-events.

Two-stage discrimination device 56 comprises a first stage discriminator 76 and a second stage discriminator 78. Two-stage discrimination device 56 receives the sequential stream of digital values from sampling device 54 and functions to eliminate those samples not representing events; that is, it eliminates the samples representing only non-events. Thus, two-stage discrimination device 56 produces a manageable stream of digital values representing detected events (only events and events plus non-events).

Referring to FIG. 5, first stage discriminator 76 initially receives the stream of digital values from A/D sampling device 54 through an input 64. Also, first stage discriminator 76 has a threshold input 78 for setting and adjusting a digital value, $x_{thd}$, used as the threshold value for the stream of digital values. First stage discriminator 76 determines, in sequence, whether each digital value is greater than or equal to $x_{thd}$. If so, the respective digital value is considered a potential event sample, or a sample having a value representative of an event, and continues to second stage discriminator 78.

If a digital value is less than $x_{thd}$, then that particular digital value is marked as being only a non-event sample. Preferably, first stage discriminator 76 marks non-event samples by marking them as non-events, such as by overwriting their digital value to zero. Despite having their digital value changed to "0," the non-event samples continue, in original sequence with potential event samples, to second stage discriminator 78. That is, every digital value, whether determined to be a potential event sample or a non-event sample, continues in original sequence to second stage discriminator 78.

Since the stream of digital values coming from first stage discriminator 76 are maintained in their original sequence, the stream comprises alternating groups of two kinds of digital values: a first group comprising a sequential stream of one or more potential event samples having digital values greater than or equal to $x_{thd}$, and a second group comprising a sequential stream of only non-event samples having a value of 0, or otherwise being marked as non-event samples. Thus, only non-event samples serve as separators between groups of potential event samples. Moreover, since all of the digital values have maintained their original sequential relationship with respect to each other, each group of potential event samples contains a number of digital values representative of at least one of the same potential events.

Second stage discriminator 78 receives alternating groups of potential event samples and non-event samples arranged according to their original sampling sequence through an input 82. Second stage discriminator 78 functions to identify event samples by their belonging to a string of at least a preselected number of contiguous potential event samples. The preset number, $x\#$, is preselected and adjusted by an input 84, and is determined based on the type of events being detected and their normal duration. If a group of potential samples has at least $x\#$ potential event samples in sequence, the group is treated as a group of event samples representing at least one detected event.

For example, if the average duration for an event of interest is 1 microsecond and the sampling rate for sampling device 54 is set at 50 million samples per second (MSPS), then $x\#$ might be set at, say, 30. That is, second stage discriminator 78 will accept any group of samples with 30 or more consecutive samples each having a digital value greater than or equal to $V_{THD}$ (from the first stage of discrimination). Thus, in this example, any event greater than or equal to 600 nanoseconds in duration would be kept for further analysis.

Preferably, second stage discriminator 78 functions by counting the number of potential event samples passing in sequence before a non-event sample passes. Since each group of potential event samples arrives sequentially and is separated by marked, non-event samples, second stage discriminator 78 continues to count sequential event samples until a marked non-event sample is detected. If the event group contains at least the preselected number of samples, $x\#$, the entire group exits second stage discriminator 78 through an output 86.

If the group of potential event samples is not of sufficient length, that is, if it does not have at least the requisite number of potential event samples occurring in sequence, the entire group is treated as noise, spurious spike or some other non-event and disregarded. As a result, output 86 from second stage discriminator, and thus from the entire two-stage discrimination process, carries a stream of event samples occurring in sequence and representing detected events.

Storage device 58 can be any digital storage medium capable of storing the amount of digital values produced by data sampling system 50. Preferably, storage device 58 further comprises a series of parallel storage areas 92, 94, 96, and 98, as shown in FIGS. 3 and 5. Each of storage areas 92, 94, 96, and 98 is preferably large enough to sequentially store all of the samples comprising one event, retaining those samples for a period long enough to allow further analysis to be performed.

Thus, a sequence of event samples, $x_A$, representing event A would be stored in area 92. Similarly, a sequence of event samples, $x_B$, representing event B would be stored in area 94. Additional event sample groups would be routed to areas 96 and 98 as needed. A greater number of storage areas could be used as dictated by the actual occurrence rate of events and the speed of processing for analysis.

As previously stated, storage device 58 may be a long-term or temporary storage medium that holds data event samples indefinitely or simply long enough for further analysis to be performed. With temporary storage, data would then be shifted out of the storage areas to allow for temporary storage of the next sequential data event samples.

One storage possibility would be to use an array of buffers, preferably first-in-first-out (FIFO) buffers. With this kind of storage, event sample groups would be shifted into a buffer area at a predetermined rate, preferably equal to the A/D sampling rate. This rate permits the previous sampling and discrimination processes to operate at normal operating speed without delay (a form of dead-time). Event sample groups are retrieved by processing means operating at a possibly different rate for further analysis.

A second possible form of digital storage allows multiple analysis processes to be performed simultaneously. That is, individual digital samples within an event group can be analyzed by more than one process as the event group progresses through, for example, a shift register buffer. The buffer is configured to be of sufficient depth so as to hold at least the minimum number of digital samples simultaneously needed by any single analysis process.

In use, a detector (not shown), such as a radiation spectroscopy detector, is placed in an area of interest. With data sampling system 50 in electrical connection with the detector, A/D sampling device 54 takes sample readings of the analog output of the detector at a frequency of, say, 50 MSPS. A/D sampling device 54 has as its output a sequential stream of discrete digital values representing the analog waveform amplitude at each sampling time.

The sequential stream of digital values then enters the first of two digital discrimination stages, shown in FIGS. 3 and 5. First stage discriminator 76 determines which digital values are greater than or equal to a preselected threshold value, $x_{thd}$. Then, second stage discriminator 78 determines which of those values occur sequentially in a group having a predetermined length or duration, $x_\#$. The groups of digital values emerging favorably from digital discrimination device 56 then pass to a temporary or long-term storage device, or other devices for further analysis.

It will be apparent to those skilled in the art that many changes and substitutions can be made to the preferred embodiment herein described without departing from the spirit and scope of the present invention as defined by the appended claims.

What is claimed is:

1. A method for use with a detector that produces a time-varying signal output representing events, said method comprising the steps of:
    sampling said output at a preselected rate to produce a sequential stream of samples including event samples and only non-event samples, said only non-event samples not representing events;
    converting each sample of said sequential stream of samples to a digital value to produce a sequential stream of digital values from said sequential stream of samples; and then
    identifying said only non-event samples from said sequential stream of digital values by evaluating each digital value of said sequential stream of digital values.

2. The method as recited in claim 1, wherein said identifying step further comprises the step of eliminating said only non-event samples from said stream of digital values.

3. The method as recited in claim 1, wherein said sampling step further comprises the steps of:
    amplifying said signal output; and
    sampling said signal output at a rate high enough so that multiple samples of said output signal are taken during each event.

4. The method as recited in claim 1, wherein said identifying step further comprises the step of comparing said stream of digital values to a threshold value, said threshold value defining event and only non-event samples, said event samples having a value greater than or equal to said threshold value, said only non-event samples having a value less than said threshold value.

5. The method as recited in claim 1, wherein said event samples have a value greater than or equal to a preselected threshold value and occur within a group of sequential samples having at least a preselected duration, and wherein said identifying step further comprises the steps of:
    comparing said stream of digital values to said threshold value, said only non-event samples having a value less than said threshold value; and
    determining said samples that occur within a group having at least said preselected duration from among said samples having a value greater than or equal to said preselected threshold value by evaluating each digital value of said stream of digital values.

6. The method as recited in claim 1, wherein said identifying step further comprises the step of eliminating said only non-event samples from said stream of samples, further comprising the step of sequentially storing said event samples in a digital storage medium.

7. The method as recited in claim 1, wherein said identifying step further comprises the step of eliminating said only non-event samples from said stream of sequential samples, further comprising the steps of simultaneously performing a series of analyzing functions on said event samples.

8. A method for use with a detector that produces a time-varying signal output representing events, said method comprising the steps of:
    sampling said output at a preselected rate to produce a sequential stream of samples including event samples and only non-event samples, said only non-event samples not representing events;
    converting each sample of said sequential stream of samples to a digital value to produce a sequential stream of digital values from said sequential stream of samples;
    comparing said stream of digital values to a threshold value, said only non-event samples having a value less than said threshold value; and determining said samples that occur within a group having at least a preselected duration from among said samples having a value greater than or equal to said preselected threshold value, said event samples having a value greater than or equal to said threshold value and occurring within a group of sequential samples having at least said preselected duration by evaluating each digital value of said stream of digital values.

9. The method as recited in claim 8, wherein said determining step further comprises the step of eliminating said samples having a value less than said threshold value and said samples not occurring within a group of sequential samples having said preselected duration.

10. The method as recited in claim 8, wherein said sampling step further comprises the steps of:
amplifying said signal output; and
sampling said signal output at a rate high enough so that multiple samples of said output signal are taken during each event.

11. The method as recited in claim 8, further comprising the step of sequentially storing said event samples in a digital storage medium.

12. The method as recited in claim 8, further comprising the step of simultaneously performing a series of analyzing functions on said event samples.

13. Apparatus for use with a detector that produces a time-varying signal output representing events, said apparatus comprising:
means in operative connection with said detector for sampling said signal output at a preselected rate, said sampling means producing a sequential stream of samples including event samples and only non-event samples, said only non-event samples not representing events;
means in operative connection with said sampling means for converting each sample of said sequential stream of samples to a digital value, said converting means producing a sequential stream of digital values from said sequential stream of samples; and
means for identifying said only non-event samples from said sequential stream of digital values by evaluating each digital value of said sequential stream of digital values.

14. The apparatus as recited in claim 13, wherein said identifying means further comprises means in operative connection with said converting means for eliminating said only non-event samples from said stream of digital values.

15. The apparatus as recited in claim 13, wherein said identifying means further comprises means for comparing said stream of digital values to a threshold value, said threshold value defining event and only non-event samples, said event samples having a value greater than or equal to said threshold value, said only non-event samples having a value less than said threshold value.

16. The apparatus as recited in claim 13, wherein said event samples have a value greater than or equal to a preselected threshold value and occur within a group of sequential samples having at least a preselected duration, and wherein identifying means further comprises:
means for comparing said stream of digital samples to said preselected threshold value, said only non-event samples having a value less than said threshold value; and
means for determining said samples that occur within a group having at least said preselected duration from among said samples having a value greater than or equal to said preselected threshold value by evaluating each digital value of said sequential stream of digital values.

17. The apparatus as recited in claim 13, wherein sampling means further comprises:
means in operative connection with said detector for amplifying said signal output; and
means in operative connection with said amplifying means for sampling said amplified signals at a rate high enough so that multiple samples of said output signal are taken during each event.

18. The apparatus as recited in claim 13, further comprising means in operative connection with said identifying means for sequentially storing said event samples in a digital storage medium.

19. The apparatus as recited in claim 13, further comprising means in operative connection with said identifying means for simultaneously performing a series of analyzing functions on said event samples.

* * * * *